United States Patent
Mizuno

(10) Patent No.: US 7,531,589 B2
(45) Date of Patent: May 12, 2009

(54) RUBBER COMPOSITION FOR BREAKER CUSHION AND TIRE USING THE SAME

(75) Inventor: Yoichi Mizuno, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 281 days.

(21) Appl. No.: 11/515,785

(22) Filed: Sep. 6, 2006

(65) Prior Publication Data

US 2007/0093580 A1 Apr. 26, 2007

(30) Foreign Application Priority Data

Oct. 21, 2005 (JP) .............................. 2005-307629

(51) Int. Cl.
*C08K 3/04* (2006.01)
*C08K 5/13* (2006.01)
(52) U.S. Cl. .................. 524/323; 524/424; 524/495
(58) Field of Classification Search ................ 524/323, 524/424, 495
See application file for complete search history.

(56) References Cited

U.S. PATENT DOCUMENTS 5,226,987 A * 7/1993 Matsumoto et al. ...... 152/209.5
5,763,558 A 6/1998 Chauvin et al.
6,310,144 B1 10/2001 Inui et al.

FOREIGN PATENT DOCUMENTS

| EP | 0 602 861 A2 | 6/1994 |
| EP | 0 675 161 A1 | 10/1995 |
| EP | 1 207 054 A1 | 5/2002 |
| EP | 1 260 384 A2 | 11/2002 |
| EP | 1 439 204 A2 | 7/2004 |
| JP | 2004-148986 A | 5/2004 |
| JP | 2004-161862 A | 6/2004 |

\* cited by examiner

*Primary Examiner*—Kriellion A Sanders
(74) *Attorney, Agent, or Firm*—Birch, Stewart, Kolasch & Birch, LLP

(57) ABSTRACT

The present invention provides a rubber composition for a breaker cushion suppressing exothermic heat and lower of rubber properties and a tire using the same. A rubber composition for a breaker cushion, comprising 25 to 35 parts by weight of carbon black having an iodine adsorption amount of 70 to 120 mg/g and 0.5 to 2.0 parts by weight of a resorcin condensate or a modified resorcin condensate based on 100 parts by weight of a rubber component, and a tire having a breaker cushion using the same.

2 Claims, No Drawings

RUBBER COMPOSITION FOR BREAKER CUSHION AND TIRE USING THE SAME

BACKGROUND OF THE INVENTION

The present invention relates to a rubber composition for a breaker cushion and a tire having a breaker cushion using the same. Specifically, the present invention relates to a rubber composition for a breaker cushion capable of suppressing exothermic heat and lowering of physical properties of a rubber, and a tire having a breaker cushion using the same.

A layer called a breaker cushion is provided between the edge portion of the breaker and the case. The breaker cushion largely affects ride quality, durability and the like.

Recently, needs for improving a service life of a tire has been enhanced and improvement of abrasion resistance of a tread rubber and enlargement of a tread width has been also promoted. It is also urgent need to drastically improve fatigue resistance of a breaker cushion rubber more than a conventional one. Consequently, it is necessary to adopt a composition excellent in hardness, elongation at break after aging and the like for the breaker cushion rubber, while keeping steering stability.

In particular, in the case of tires for heavy load such as a bus and an autotruck, temperature rising of the edge portion of a breaker is remarkable, and separation may occasionally generated between an edge rubber of the breaker and steel cords due to thermal aging. Naturally, a breaker cushion portion nearby the area is subject to very intensive thermal fatigue at running. Further, the rubber is remarkably hardened, and the breaker cushion rubber is destroyed by external stimulation, which could cause burst. Accordingly, the requisite properties of the breaker cushion rubber include that it is a rubber which is small in excessive increase of hardness due to exothermic heat and lowering of tensile property after aging while enduring heavy load.

Consequently, for example, when high grade carbon black such as SAF class having favorable tensile property is used, it is deficient in low exothermic property and when low grade carbon black such as FEF class having favorable low exothermic property is used, the tensile property is lowered; therefore, ISAF class and HAF class carbon black have been preferably used. However, since the long life of a tire is promoted in future, further improvement of durability is an urgent need.

JP-A-2004-161862 discloses a rubber composition for a breaker cushion excellent in low exothermic property and small in lowering of tensile property after aging while keeping steering stability, by comprising the specified amount of specific silica and carbon black in the rubber component, but the hardness after aging was not described at all, and further, a retention rate of the tensile property was also not insufficient.

SUMMARY OF THE INVENTION

An object of the present invention is to provide a rubber composition for a breaker cushion suppressing exothermic heat and the lowering of rubber property, and a tire using the same.

The present invention relates to a rubber composition for a breaker cushion comprising 25 to 35 parts by weight of carbon black having an iodine adsorption amount of 70 to 120 mg/g and 0.5 to 2 parts by weight of a resorcin condensate or a modified resorcin condensate based on 100 parts by weight of a rubber component.

It is preferable that the rubber composition further comprises 0.5 to 2 parts by weight of a methylene donor.

Further, the present invention relates to a tire having a breaker cushion using the rubber composition.

DETAILED DESCRIPTION

The rubber composition for a breaker cushion of the present invention comprises a rubber component, carbon black and a resorcin condensate or a modified resorcin condensate.

The rubber component is not particularly limited, may be those which are generally used in the rubber industry, and examples are a natural rubber (NR), an isoprene rubber (IR), a butadiene rubber (BR), and a styrene-butadiene rubber (SBR). These rubbers may be used alone and at least 2 kinds thereof may be used in combination. As the rubber component, NR or IR is preferable from the viewpoint of excellent low exothermic property.

The iodine adsorption amount (IA) of carbon black is at least 70 mg/g and preferably at least 90 mg/g. When IA is less than 70 mg/g, reinforcing property and rigidity (steering stability) are insufficient. Further, IA is at most 120 mg/g, and preferably at most 110 mg/g. When LA exceeds 120 mg/g, the low exothermic property is inferior.

An amount of carbon black is at least 25 parts by weight based on 100 parts by weight of the rubber component, and preferably at least 27.5 parts by weight. When the amount of carbon black is less than 25 parts by weight, hardness is lowered and sufficient reinforcing property and rigidity are not obtained. Further, the amount of carbon black is at most 35 parts by weight, and preferably at most 32.5 parts by weight. When it exceeds 35 parts by weight, the low exothermic property and elongation at break are lowered.

A resorcin condensate used in the present invention refers to a compound represented by the following chemical formula, wherein n is an integer of at least 1.

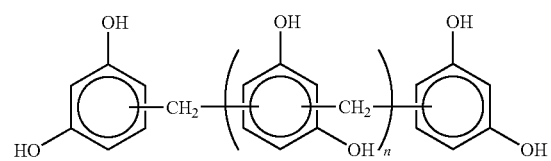

Further, a modified resorcin condensate refers to a compound represented by the following chemical formula, wherein n is an integer. Further, in the formula, R is preferably an alkyl group.

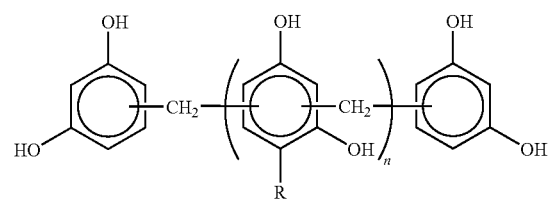

Examples of the modified resorcin condensate are a resorcin-alkylphenol-formalin copolymer, a penacolite resin of a resorcin-formalin reaction product, and RSM (a mixture of about 60% by weight of resorcin and about 40% by weight of stearic acid), but the resorcin-alkylphenol-formalin copolymer and RSM (a mixture of about 60% by weight of resorcin and about 40% by weight of stearic acid) are preferable.

An amount of the resorcin condensate or modified resorcin condensate is at least 0.5 part by weight based on 100 parts by weight of the rubber component, and preferably at least 0.75 part by weight. When the amount is less than 0.5 part by weight, an effect of suppressing change of physical properties of the obtained rubber composition is small. Further, the amount of the resorcin condensate or modified resorcin condensate is at most 2 parts by weight, and preferably at most 1.5 parts by weight. When it exceeds 2 parts by weight, hardness and rigidity are excessively increased, and elongation at break is lowered.

The present invention is excellent in the balance of the rigidity, tensile strength and elongation at break by compounding the resorcin condensate or modified resorcin condensate in the rubber composition, and can exhibit more excellent performance than the rubber composition compounding a cresol resin represented by the following chemical formula in place of the resorcin condensate or modified resorcin condensate.

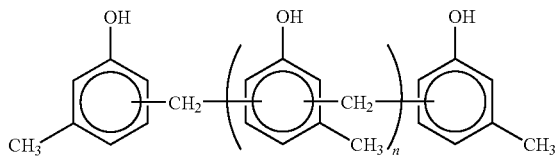

A methylene donor is preferably further compounded in the rubber composition for a breaker cushion of the present invention.

Examples of the methylene donor are hexamethylenetetramine, a methylolmelamine resin, and hexamethoxymethylolmelamine, and hexamethylenetetramine and Sumikanol 507 are preferable.

An amount of the methylene donor is preferably at least 0.5 part by weight based on 100 parts by weight of the rubber component, and more preferably at least 0.75 part by weight. When the amount of the methylene donor is less than 0.5 part by weight, an effect of suppressing change of physical properties tends to be small. Further, the amount of the methylene donor is preferably at most 2 parts by weight, and more preferably at most 1.5 parts by weight. When the amount of the methylene donor exceeds 2 parts by weight, hardness and rigidity are excessively increased and elongation at break tends to be lowered.

Further, the rubber composition for a breaker cushion of the present invention can suitably compound an antioxidant, a softening agent, stearic acid, zinc oxide, sulfur, a vulcanization accelerator and the like which are generally used in the rubber industry, in addition to the rubber component, carbon black, the resorcin condensate or modified resorcin condensate and the methylene donor.

The rubber composition for a breaker cushion of the present invention is vulcanized after molding to be used as a breaker cushion, but in particular, it is preferably used as the breaker cushion for heavy load such as a bus and an autotruck.

EXAMPLES

The present invention is explained in detail based on Examples, but is not limited only thereto.

Various chemicals used in Examples and Comparative Examples of the present invention are explained in the following.

Natural rubber: RSS#3
Carbon black 1: DIABLACK I available from Mitsubishi Chemical Corporation (N220, iodine adsorption amount: 118 mg/g)
Carbon black 2: DIABLACK LI available from Mitsubishi Chemical Corporation (N219, iodine adsorption amount: 110 mg/g)
Modified resorcin condensate 1: Sumikanol 620 available from Sumitomo Chemical Co., Ltd. (resorcin-alkylphenol-formalin copolymer)
Modified resorcin condensate 2: RSM (a mixture of about 60% by weight of resorcin and about 40% by weight of stearic acid) available from Sumitomo Chemical Co., Ltd.
Methylene donor 1: Sumikanol 507 (a mixture of about 50% by weight of methylolmelamine resin and about 50% by weight of silica and oil) available from Sumitomo Chemical Co., Ltd.
Methylene donor 2: NOCCELER H (hexamethylenetetramine) available from OUCHI SHINKO CHEMICAL INDUSTRIAL CO., LTD.
Antioxidant: NONFLEX RD (2,2,4-trimethyl- 1,2-dihydroquinoline) available from Seiko Chemical Co., Ltd.
Stearic acid: "KIRI" available from NOF Corporation
Zinc oxide: GINREI R available from Toho Zinc Co., Ltd.
Sulfur: available from Tsurumi Chemical Co., Ltd.
Vulcanization accelerator: NOCCELER NS (N-tert-butyl-2-benzothiazolylsulfenamide) available from OUCHI SHINKO CHEMICAL INDUSTRIAL CO., LTD.

Examples 1 to 15 and Comparative Examples 1 to 4

Chemicals other than sulfur and a vulcanization accelerator were kneaded in accordance the compounding prescription shown in Table 1 at 150° C. for 5 minutes using a 1.7 L Banbury mixer. Sulfur and the vulcanization accelerator were added by the compounding amounts shown in Table 1 to the obtained kneaded articles, and the mixture was kneaded at 80° C. for 5 minutes using a twin screw open roll to obtain unvulcanized rubber compositions. Then, a breaker cushion in which the composition was divided into 6 to the peripheral direction of tires was molded using the unvulcanized rubber compositions, and tires for a bus and an autotruck (tire size: 11R22.5) were prepared by vulcanizing for 30 minutes under the conditions of 150° C. and 20 kgf, and the following respective tests were carried out.

(Viscoelasticity Test)

Test pieces having a width of 4 mm, a length of 40 mm and a thickness of 1 mm were cut out from the breaker cushions of tires prepared according to the above description, and loss tangent tan δ was measured under the conditions of an initial strain of 10%, a temperature of 60° C., a frequency of 10 Hz and a dynamic strain of 1% using a viscoelasticity spectrometer manufactured by Iwamoto Seisakusyo K.K. It is indicated that the smaller the tan δ is, the better the low exothermic property and rolling resistance property are, and the tan δ is preferably at most 0.055.

(Appearance After Road Test)

The prepared tires were loaded on a 10t autotruck and appearance after running for 200000 km were compared. Further, breaking down the tires, the presence of cracks at the breaker cushion part was visually evaluated.

◯: There was no problem on the appearance, and also no crack was generated at a breaker cushion part.

Δ: There was no problem on the appearance, but fine cracks were generated at a breaker cushion part.

X: It was confirmed that tires were swollen on the appearance and cracks were generated.

(Hardness Test)

The hardness (JIS-A) of the test pieces which were cut out from tires before the road test and after the road test was measured under the condition of 25° C. using a JIS-A hardness tester. Further, the difference of hardness before and after the road test was calculated according to the calculation formula described in the following. The hardness before the road test is preferably at least 53, and hardness after the road test is preferably at most 62. It is indicated that the smaller the difference of the hardness is, the smaller the difference of hardness before and after the road test is, which is excellent in durability.

(Difference of hardness)=(Hardness after road test)−(Hardness before road test)

<Tensile Test>

No.3 dumbbell test pieces were punched out from the breaker cushion parts of tires before the road test and after the road test, and a tensile test was carried out according to JIS K6251 to measure the elongation at break (EB). Further, retention rates of the elongation at break before and after the road test were calculated by the under-mentioned calculation formula. The elongation at break before the road test is preferably at least 450%, and the elongation at break after the road test is preferably at least 350%. Further, it is indicated that the larger the retention rate is, the smaller the change of physical properties is, which is excellent, and it is preferably at least 78.

(Retention rate)=(Elongation at break after road test)÷(Elongation at break before road test)×100

Test results are shown in Table 1.

TABLE 1

| | Ex. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Amounts (part by weight) | | | | | | | | | | | | |
| Natural rubber | 100 | 100 | 100 | 100 | 100 | 100 | 100 | 100 | 100 | 100 | 100 | 100 |
| Antioxidant | 2 | 2 | 2 | 2 | 2 | 2 | 2 | 2 | 2 | 2 | 2 | 2 |
| Stearic acid | 3 | 3 | 3 | 3 | 3 | 3 | 3 | 3 | 3 | 3 | 3 | 3 |
| Zinc oxide | 4 | 4 | 4 | 4 | 4 | 4 | 4 | 4 | 4 | 4 | 4 | 4 |
| Sulfur | 2 | 2 | 2 | 2 | 2 | 2 | 2 | 2 | 2 | 2 | 2 | 2 |
| Vulcanization accelerator | 1 | 1 | 1 | 1 | 1 | 1 | 1 | 1 | 1 | 1 | 1 | 1 |
| Carbon black 1 | 35 | 30 | 25 | 30 | 30 | 30 | 30 | 30 | 30 | 30 | — | — |
| Carbon black 2 | — | — | — | — | — | — | — | — | — | — | 30 | 35 |
| Modified resorcin condensate 1 | 1 | 1 | 1 | 0.5 | 0.5 | 0.5 | 1 | 2 | 2 | 2 | 1 | 1 |
| Modified resorcin condensate 2 | — | — | — | — | — | — | — | — | — | — | — | — |
| Methylene donor 1 | 1.5 | 1.5 | 1.5 | 0.5 | 1 | 2 | 2 | 0.5 | 1 | 2 | 1.5 | 1.5 |
| Methylene donor 2 | — | — | — | — | — | — | — | — | — | — | — | — |
| Evaluation results | | | | | | | | | | | | |
| (1) Loss tangent | 0.052 | 0.045 | 0.042 | 0.048 | 0.047 | 0.046 | 0.044 | 0.042 | 0.046 | 0.045 | 0.048 | 0.053 |
| (2) Appearance after road test | ◯ | ◯ | ◯ | ◯ | ◯ | ◯ | ◯ | ◯ | ◯ | ◯ | ◯ | ◯ |
| (3) Physical properties before or after road test Hardness | | | | | | | | | | | | |
| Before road test | 58 | 56 | 54 | 55 | 55 | 56 | 57 | 56 | 56 | 57 | 55 | 58 |
| After road test | 62 | 60 | 57 | 60 | 60 | 61 | 61 | 60 | 61 | 62 | 59 | 62 |
| Difference of hardness | 4 | 4 | 3 | 5 | 5 | 5 | 4 | 4 | 5 | 5 | 4 | 4 |
| $E_B$ (%) | | | | | | | | | | | | |
| After road test | 470 | 500 | 510 | 500 | 495 | 495 | 485 | 505 | 495 | 485 | 525 | 495 |
| After road test | 350 | 400 | 400 | 370 | 365 | 375 | 360 | 395 | 385 | 370 | 425 | 380 |
| Retention rate | 74 | 80 | 78 | 74 | 74 | 76 | 74 | 78 | 78 | 76 | 81 | 77 |

| | Ex. | | | Com. Ex. | | | |
|---|---|---|---|---|---|---|---|
| | 13 | 14 | 15 | 1 | 2 | 3 | 4 |
| Amounts (part by weight) | | | | | | | |
| Natural rubber | 100 | 100 | 100 | 100 | 100 | 100 | 100 |
| Antioxidant | 2 | 2 | 2 | 2 | 2 | 2 | 2 |
| Stearic acid | 3 | 3 | 3 | 3 | 3 | 3 | 3 |
| Zinc oxide | 4 | 4 | 4 | 4 | 4 | 4 | 4 |
| Sulfur | 2 | 2 | 2 | 2 | 2 | 2 | 2 |
| Vulcanization accelerator | 1 | 1 | 1 | 1 | 1 | 1 | 1 |

TABLE 1-continued

|  | | | | | | | |
|---|---|---|---|---|---|---|---|
| Carbon black 1 | 30 | 30 | 30 | 30 | 40 | 20 | 30 |
| Carbon black 2 | — | — | — | — | — | — | — |
| Modified resorcin condensate 1 | — | 0.5 | 2 | — | 1 | 1 | 2.5 |
| Modified resorcin condensate 2 | 1 | — | — | — | — | — | — |
| Methylene donor 1 | — | 0.25 | 2.5 | — | 1.5 | 1.5 | 2 |
| Methylene donor 2 | 1.5 | — | — | — | — | — | — |
| Evaluation results | | | | | | | |
| (1) Loss tangent | 0.051 | 0.049 | 0.045 | 0.05 | 0.059 | 0.038 | 0.045 |
| (2) Appearance after road test | ○ | ○ | Δ | Δ | Δ | ○ | ○ |
| (3) Physical properties before or after road test | | | | | | | |
| Hardness | | | | | | | |
| Before road test | 56 | 54 | 58 | 53 | 60 | 52 | 58 |
| After road test | 61 | 60 | 64 | 60 | 64 | 56 | 64 |
| Difference of hardness | 5 | 6 | 6 | 7 | 4 | 4 | 6 |
| $E_B$ (%) | | | | | | | |
| After road test | 510 | 530 | 445 | 520 | 430 | 470 | 455 |
| After road test | 390 | 345 | 340 | 345 | 320 | 355 | 345 |
| Retention rate | 76 | 65 | 76 | 66 | 74 | 76 | 76 |

In Examples 1 to 15 in which the predetermined amounts of carbon black and the modified resorcin condensate were compounded, low exothermic property, appearance, hardness, elongation at break and suppressing force of physical property change were excellent.

On the contrary, in Comparative Example 1 in which the resorcin condensate or modified resorcin condensate was not compounded, suppressing force of physical property change before and after the road test and appearance were inferior.

In Comparative Example 2 in which the amount of carbon black exceeded 35 parts by weight, low exothermic property and elongation at break were inferior.

In Comparative Example 3 in which the compounding amount of carbon black was less than 25 parts by weight, hardness and rigidity were low, and steering stability was inferior.

In Comparative Example 4 in which the amount of a resin comprising the resorcin condensate or modified resorcin condensate exceeded 2 parts by weight, hardness excessively increased, and also elongation at break was lowered.

According to the present invention, a rubber composition for a breaker cushion capable of suppressing exothermic heat and lowering of physical properties of a rubber by compounding a suitable amount of a resorcin condensate or a modified resorcin condensate, and a tire having a breaker cushion using the same can be provided.

What is claimed is:

1. A tire having a breaker cushion formed from a rubber composition comprising:
    25 to 35 parts by weight of carbon black having an iodine adsorption amount of 70 to 120 mg/g, and
    0.5 to 2 parts by weight of a resorcin condensate or a modified resorcin condensate based on 100 parts by weight of a rubber component.
2. The tire according to claim 1, wherein the rubber composition for the breaker cushion further comprises 0.5 to 2 parts by weight of a methylene donor.

* * * * *